United States Patent
Vemulapati et al.

(10) Patent No.: US 10,519,704 B2
(45) Date of Patent: Dec. 31, 2019

(54) GLOVE BOX ASSEMBLY WITH LIVING HINGE AND METHODS OF INSTALLING THE SAME

(71) Applicant: Ford Global Technologies, LLC, Dearborn, MI (US)

(72) Inventors: Satyanarayana Raju Vemulapati, Westland, MI (US); Vijaykumar Hegde, Canton, MI (US); Scott H. Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 15/958,299

(22) Filed: Apr. 20, 2018

(65) Prior Publication Data
US 2019/0323274 A1    Oct. 24, 2019

(51) Int. Cl.
E05D 7/10 (2006.01)
E05D 3/02 (2006.01)
B60R 7/06 (2006.01)

(52) U.S. Cl.
CPC ............. *E05D 7/1077* (2013.01); *B60R 7/06* (2013.01); *E05D 3/02* (2013.01); *E05Y 2900/538* (2013.01)

(58) Field of Classification Search
CPC ........... E05D 7/1077; E05D 3/02; B60R 7/06; E05Y 2900/538
See application file for complete search history.

(56) References Cited

U.S. PATENT DOCUMENTS

| 5,494,245 | A | * | 2/1996 | Suzuki | F16L 3/1075 24/487 |
|---|---|---|---|---|---|
| 5,516,177 | A | * | 5/1996 | Levely | B60R 7/06 16/85 |
| 6,076,878 | A | | 6/2000 | Isano | |
| 6,799,785 | B1 | * | 10/2004 | Davis, Jr. | B60R 7/06 16/303 |
| 7,152,898 | B2 | * | 12/2006 | Augustyniak | B60R 7/06 296/37.12 |
| 2007/0096489 | A1 | | 5/2007 | Park | |
| 2010/0148531 | A1 | | 6/2010 | Evans et al. | |

FOREIGN PATENT DOCUMENTS

EP    0094569 A1    11/1983

* cited by examiner

*Primary Examiner* — Pinel E Romain
(74) *Attorney, Agent, or Firm* — Vichit Chea; Price Heneveld LLP

(57) ABSTRACT

A glove box assembly includes a first tab adapted for coupling to a dashboard substrate. A glove box door includes a second tab. The glove box assembly includes a living hinge. A hinge pin is located within the tabs. The tabs are pivotably coupled to the hinge pin and the living hinge retains a longitudinal position of the hinge pin.

17 Claims, 5 Drawing Sheets

GLOVE BOX ASSEMBLY WITH LIVING HINGE AND METHODS OF INSTALLING THE SAME

FIELD OF THE INVENTION

The present invention generally relates to a glove box assembly, and more particularly to a hinge pin for coupling of a glove box door to a dashboard substrate, along with methods of installing the same.

BACKGROUND OF THE INVENTION

Vehicular glove box assemblies are configured for storing small cargo within a vehicle dash. Glove box assemblies generally include a glove box door coupled to a dashboard substrate by at least one mounting element. However, the installation of traditional glove box assemblies is often time-consuming. Additionally, mounting elements used for coupling the glove box door to the dashboard substrate are vulnerable to distortion, which in some cases may lead to decoupling of the glove box door from the dashboard substrate.

Therefore, it would be useful to provide an improved glove box assembly capable of straightforward installation and resistance to distortion forces of the glove box door.

SUMMARY OF THE INVENTION

According to one aspect of the present invention, a glove box assembly includes a first tab adapted for coupling to a dashboard substrate. A glove box door includes a second tab. The glove box assembly includes a living hinge. A hinge pin is located within the tabs. The tabs are pivotably coupled to the hinge pin and the living hinge retains a longitudinal position of the hinge pin.

Embodiments of the first aspect of the invention can include any one or a combination of the following features:
  the living hinge is coupled to the dashboard substrate by an articulated connection;
  the living hinge comprises a notch configured to secure an orthogonal foot of the hinge pin;
  the first tab comprises a pair of raised portions and the second tab is interposed between the pair of raised portions;
  the second tab and the pair of raised portions comprise a channel, the hinge pin extending through the channel;
  the living hinge comprises at least one resilient retainer portion coupled to the dashboard substrate; and
  the at least one resilient retainer portion comprises a snap-fitting element.

According to another aspect of the present invention, a glove box assembly includes a first tab adapted for coupling to a dashboard substrate. A living hinge is removably coupled to the dashboard substrate. A glove box door includes a second tab. A hinge pin is located within the tabs. The tabs are pivotably coupled to the hinge pin and the living hinge retains a longitudinal position of the hinge pin.

Embodiments of the second aspect of the invention can include any one or a combination of the following features:
  the living hinge is coupled to the dashboard substrate by an articulated connection;
  the living hinge comprises a notch configured to secure an orthogonal foot of the hinge pin;
  the first tab comprises a pair of raised portions and the second tab is interposed between the pair of raised portions;
  the tabs comprise a channel, the hinge pin extending through the channel;
  the living hinge comprises at least one resilient retainer portion removably coupled to the dashboard substrate; and
  the at least one resilient retainer portion comprises a snap-fitting element.

According to yet another aspect of the present invention, a method of installing a glove box assembly includes aligning a glove box door tab with a dashboard substrate tab. The dashboard substrate tab is adapted for coupling to a dashboard substrate. A hinge pin is inserted through the tabs to pivotably couple the door to the substrate. A living hinge is coupled to the substrate and the hinge pin. The living hinge retains a longitudinal position of the hinge pin.

Embodiments of the third aspect of the invention can include any one or a combination of the following features:
  the coupling step is conducted such that the living hinge is coupled to the dashboard substrate by an articulated connection;
  the living hinge comprises a notch configured to secure an orthogonal foot of the hinge pin;
  the dashboard substrate tab comprises a pair of raised portions and the glove box door tab is interposed between the pair of raised portions;
  the coupling step is conducted such that the living hinge is removably coupled to the dashboard substrate by at least one resilient retainer portion of the hinge; and
  the at least one resilient retainer portion comprises a snap-fitting element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
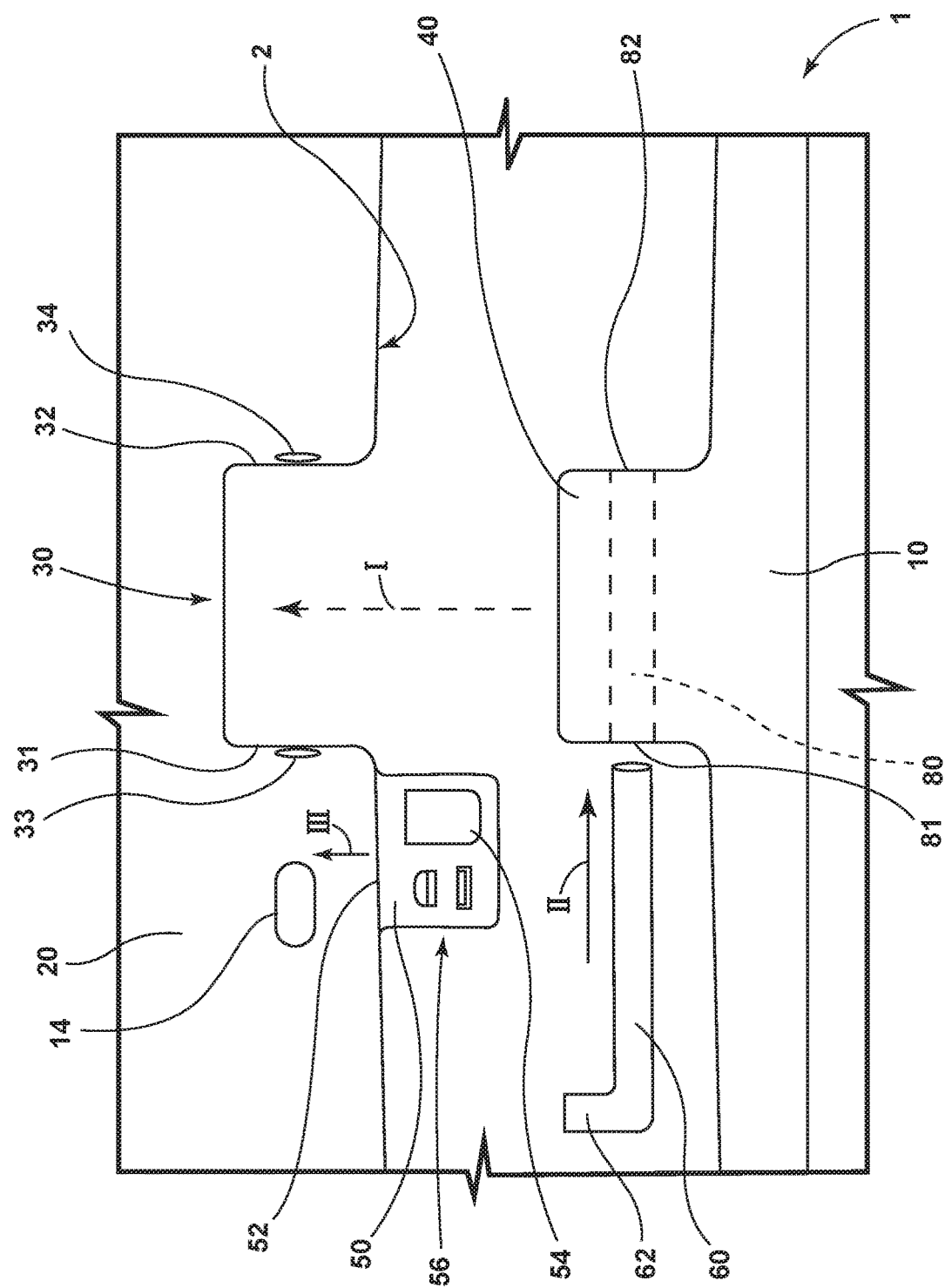
FIG. 1A is an exploded view of a glove box assembly of the present invention.

For purposes of description herein, the terms "upper," "lower," "right," "left," "rear," "front," "vertical," "horizontal," "interior," "exterior," "vehicular forward," "vehicular rearward" and derivatives thereof shall relate to the invention as oriented in FIG. 1A. However, the invention may assume various alternative orientations, except where expressly specified to the contrary. It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or numeral of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The following disclosure describes a glove box assembly for a vehicle. The glove box assembly facilitates installation of a glove box door to a vehicle dashboard substrate. The glove box assembly includes a hinge pin for coupling of a first tab to a second tab adapted for coupling the glove box door to the dashboard substrate. The second tab is pivotably coupled to the hinge pin in order to enable opening and closing of the glove box door, which conceals a glove box compartment. A living hinge is proximate the first tab and is configured to retain a longitudinal position of the hinge pin when the living hinge is in an installed position. As such, longitudinal movement of the hinge pin within the first tab is restricted, and distortion or decoupling of the glove box door from the dashboard substrate is prevented.

Figure 1B:
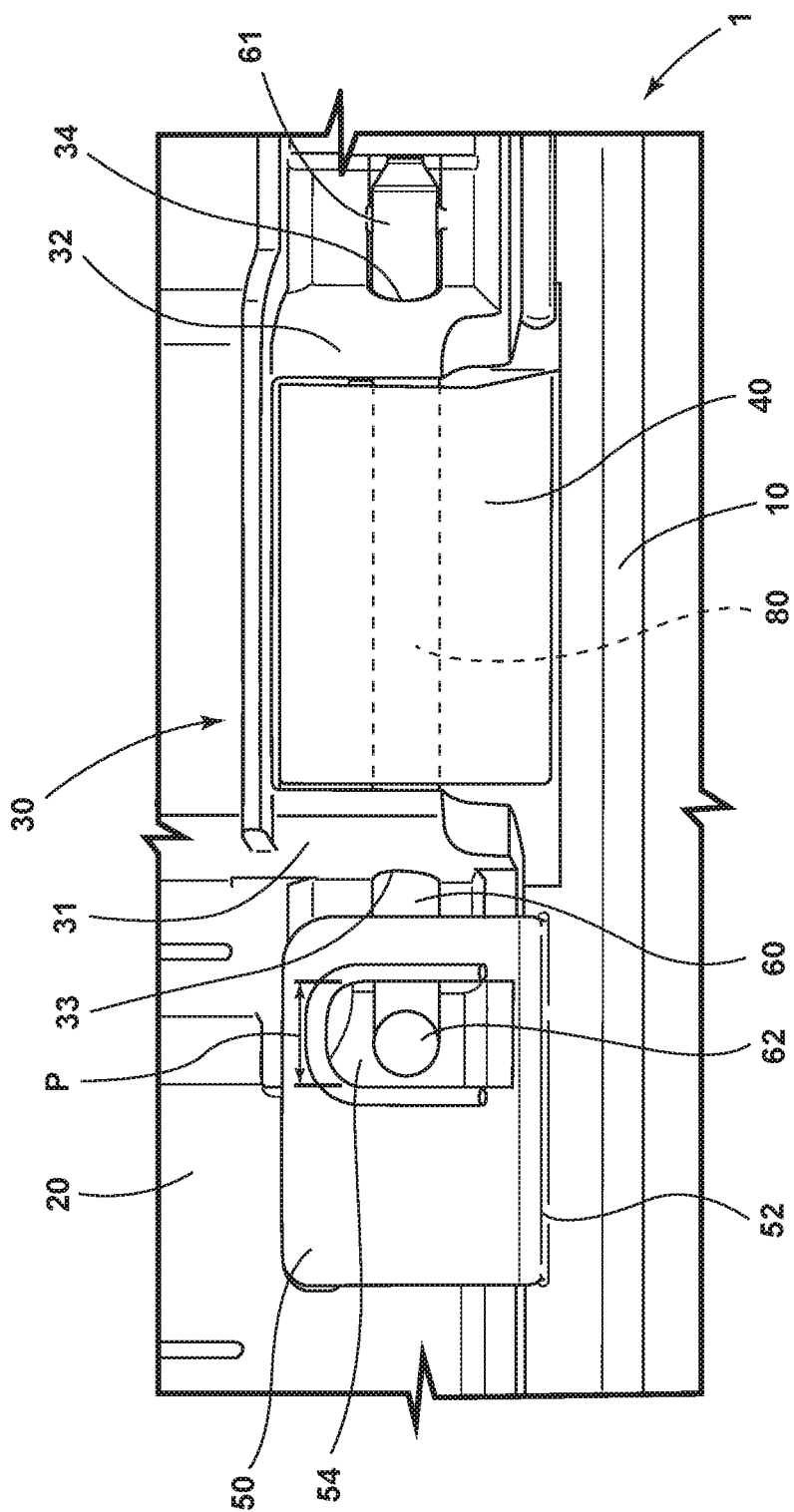
FIG. 1B a perspective view of the glove box assembly of FIG. 1A.
Figure 2:
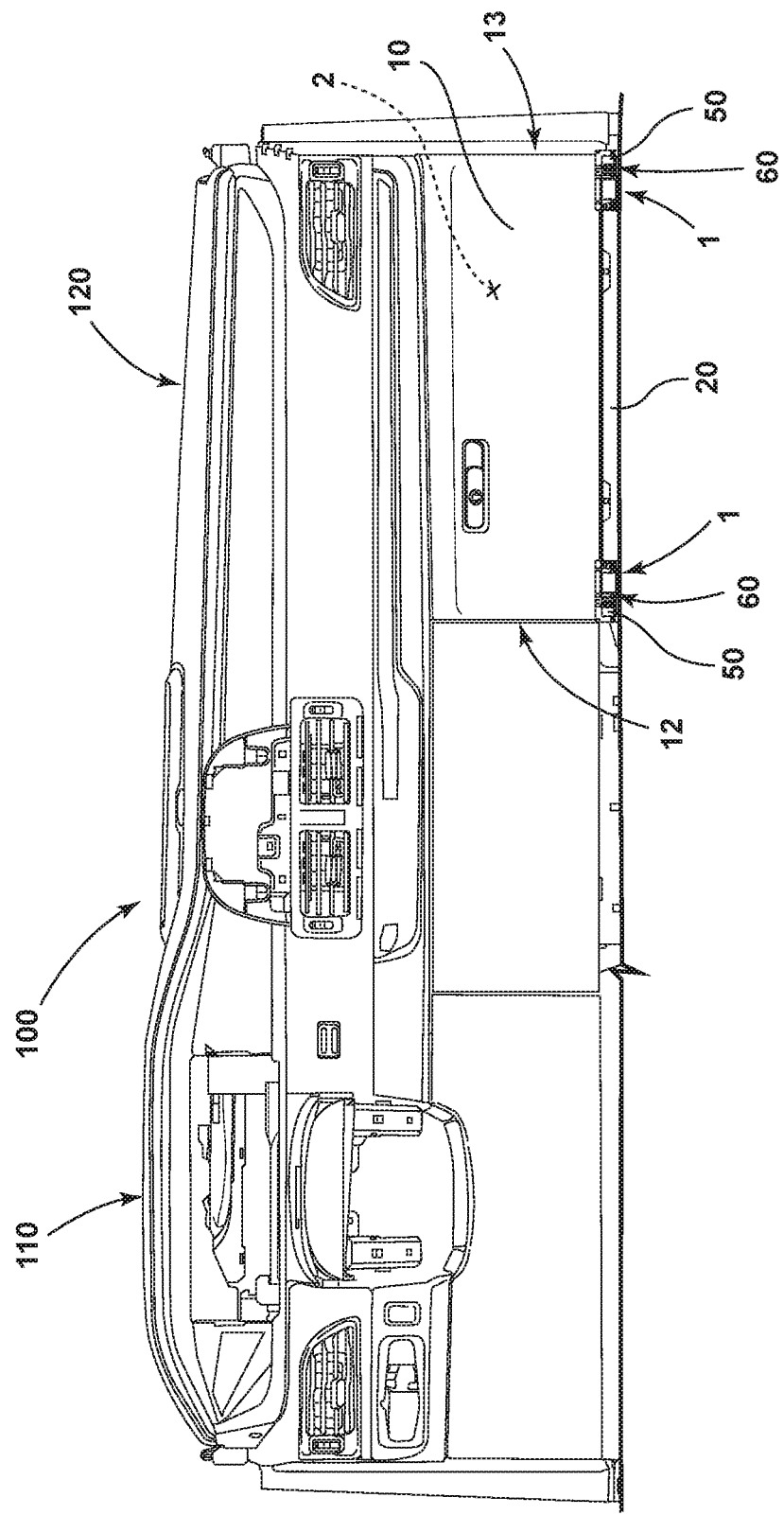
FIG. 2 is a rear perspective view of a vehicle dashboard substrate including the glove box assembly of FIG. 1B.

Referring to FIGS. 1A-2, a glove box assembly 1 is illustrated. The glove box assembly 1 includes a glove box door 10 for concealing a glove box compartment 2 within a dashboard substrate 20 (see FIG. 2). The dashboard substrate 20 includes a first tab 30 and a living hinge 50. A second tab 40 is adapted for coupling the glove box door 10 to the dashboard substrate 20. A hinge pin 60 is located within the first and second tabs 30, 40. The first and second tabs 30, 40 are pivotably coupled to the hinge pin 60, and the living hinge 50 retains a longitudinal position P of the hinge pin 60 (FIG. 1B).

Referring to FIGS. 1A and 1B, the glove box door 10 of the glove box assembly 1 is adapted for coupling to the dashboard substrate 20. In embodiments, the dashboard substrate 20 includes a first tab 30 having first and second raised portions 31, 32. First and second apertures 33, 34 are disposed on the first and second raised portions 31, 32, respectively. In embodiments, the second tab 40 is a raised protuberance extending outward from the glove box door 10. However, the second tab 40 may also be a separate feature that is mounted or fastened to the glove box door 10 by attachment features (not shown). Alternatively, the first tab 30 may be disposed upon the glove box door 10, with the first and second raised portions 31, 32 extending outwardly from the glove box door 10. Further, the second tab 40 may be adapted as a hollow protuberance extending outward from the dashboard substrate 20. A channel 80 extends through a length of the second tab 40 to define first and second openings 81, 82 disposed on each side of the second tab 40. In the preferred embodiment, the channel 80 is continuous and extends completely through the second tab 40. In another embodiment, the channel 80 may extend partially through the second tab 40 and may include a first opening 81.

In assembly, the glove box door 10 of the glove box assembly 1 is positioned onto the dashboard substrate 20, as shown by arrow I (FIG. 1A). The second tab 40 is interposed between the first and second raised portions 31, 32 of the first tab 30 when the glove box door 10 is installed (FIG. 1B). Further, the first and second raised portions 31, 32 abut the second tab 40, and the first and second apertures 33, 34 are aligned with the first and second openings 81, 82 (FIG. 1A) As such, the distance between the first and second raised portions 31, 32 of the first tab 30 is greater than a length of the second tab 40.

With continued reference to FIGS. 1A and 1B, the hinge pin 60 of the glove box assembly 1 pivotably couples the first tab 30 to the second tab 40 (FIG. 1B). The hinge pin 60 is inserted through the first raised portion 31 at the first aperture 33 and the first opening 81 in order to extend through the channel 80, as shown by arrow II (FIG. 1A). The hinge pin 60 includes a projecting portion 61 that extends from the second aperture 34 of the second raised portion 32. The length of the hinge pin 60 is greater than the distance between the first and second raised portions 31, 32 of the first tab 30, such that the projecting portion 61 is exposed outside of the channel 80. The hinge pin 60 includes an orthogonal foot 62 that is proximate the first raised portion 31. The orthogonal foot 62 is configured to prevent the hinge pin 60 from sliding into the channel 80, which may result in distortion of a position of the glove box door 10 relative to the dashboard substrate 20. In the depicted embodiment, the orthogonal foot 62 is shown to extend perpendicular from the hinge pin 60. However, the orthogonal foot 62 may include additional or alternative features configured to prevent the hinge pin 60 from sliding into the channel 80. For instance, the hinge pin 60 may include a portion with a girth greater than that of the channel 80, which prevents the hinge pin 60 from being fully inserted into the channel 80.

Referring again to FIGS. 1A and 1B, the glove box assembly 1 includes the living hinge 50 connected to the dashboard substrate 20 at an articulated connection 52 proximate to the first raised portion 31 of the first tab 30. The living hinge 50 is movable between an uninstalled position and an installed position. While in the uninstalled position, the living hinge 50 is unsecured and pivotable about the articulated connection 52. While the living hinge 50 is in the uninstalled position, the hinge pin 60 may be easily inserted or removed from the first and second tabs 30, 40. The living hinge 50 is pivoted about the articulated connection 52 into the installed position, as shown by arrow III (FIG. 1A). While in the installed position, the living hinge 50 is removably coupled to the dashboard substrate 20 by a resilient retainer portion 56. The resilient retainer portion 56 is removably coupled to the dashboard substrate at a slot 14. The living hinge 50 includes a notch 54 that clutches the orthogonal foot 62 once the hinge pin 60 has been inserted and the living hinge 50 is moved to the installed position. The living hinge 50 is configured to retain the longitudinal position P of the hinge pin 60 by preventing the orthogonal foot 62 from sliding longitudinally with respect to the first tab 30. In this way, rotational movement of the hinge pin 60 within the channel 80 is enabled, while longitudinal movement of the hinge pin 60 within the channel 80 is prevented. Although the preferred embodiment includes a resilient retainer portion 56 that is removably coupled to the dashboard substrate, the living hinge 50 may include additional or alternative features configured to hold the living hinge 50 in an installed position.

Referring to FIG. 2, the glove box assembly 1 is shown coupled to the vehicle dashboard substrate 20 within a vehicle cabin 100. The glove box assembly 1 is generally shown opposite a vehicle steering column 110 proximate a passenger-side 120 of the vehicle cabin 100. As shown in FIG. 2, embodiments of the glove box assembly 1 can include multiple living hinges 50 and hinge pins 60, which may be used for coupling of the glove box door 10 to the dashboard substrate 20. In the depicted embodiment, at least two hinge pins 60 are shown coupling the glove box door 10 to the dashboard substrate 20 at left and right edges 12, 13 of the glove box door 10. Alternatively, a single hinge pin 60 may be utilized in order to couple the glove box door 10 to the dashboard substrate 20.

Figure 4:
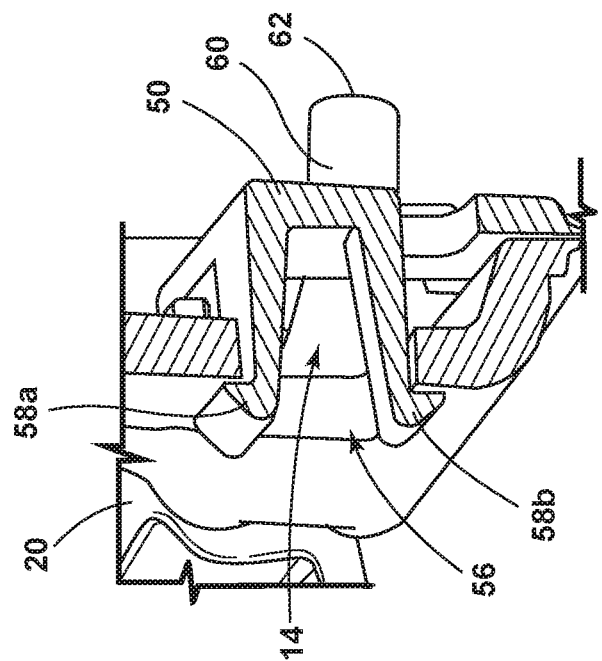
FIG. 4 is a side perspective view of the hinge pin of the glove box assembly of FIG. 3 in an installed position.
Figure 3:
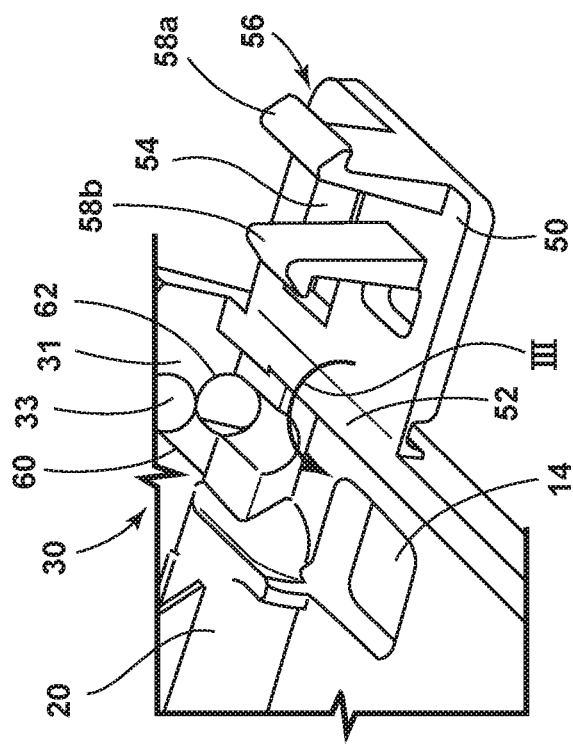
FIG. 3 is a front perspective view of a hinge pin of a glove box assembly of the present invention in an uninstalled position.

Referring to FIGS. 3 and 4, the living hinge 50 includes the notch 54 configured to clutch the orthogonal foot 62 of the hinge pin 60 in order to retain the longitudinal position P (FIG. 1B) of the hinge pin 60. The living hinge 50 is pivoted about the articulated connection 52 into the installed position, as shown by arrow III (FIG. 3). At least one resilient retainer portion 56 is configured to secure the living hinge 50 to the dashboard substrate by coupling to a slot 14 located on the dashboard substrate 20. The at least one resilient retainer portion 56 includes first and second snap-fitting elements 58a, 58b. The first and the second snap-fitting elements 58a, 58b are biased towards an orthogonal position with respect to the living hinge 50, and are configured to flex within the slot 14 in order to secure the living hinge 50 in the installed position. The first and second snap-fitting elements 58a, 58b of the resilient retainer portion 56 are each removably coupled to the dashboard substrate 20 such that the living hinge 50 may be easily adjusted between the installed an uninstalled positions, thus allowing insertion or removal of the hinge pin 60. Although the depicted embodiment includes two snap-fitting elements 58a, 58b, the glove box assembly 1 may include one or more snap-fitting elements configured to secure the living hinge 50 to the dashboard substrate 20 in the installed position. Additionally, the hinge pin 60 may include alternative features configured to secure the living hinge 50 in the installed position. Alternatively, the living hinge 50 may be molded to the glove box door 10 at the articulated connection 52. In this embodiment, the living hinge 50 may be removably coupled to the glove box door 10 in the locked position, in a similar manner to the removable coupling of the living hinge 50 to the dashboard substrate 20.

Figure 5:
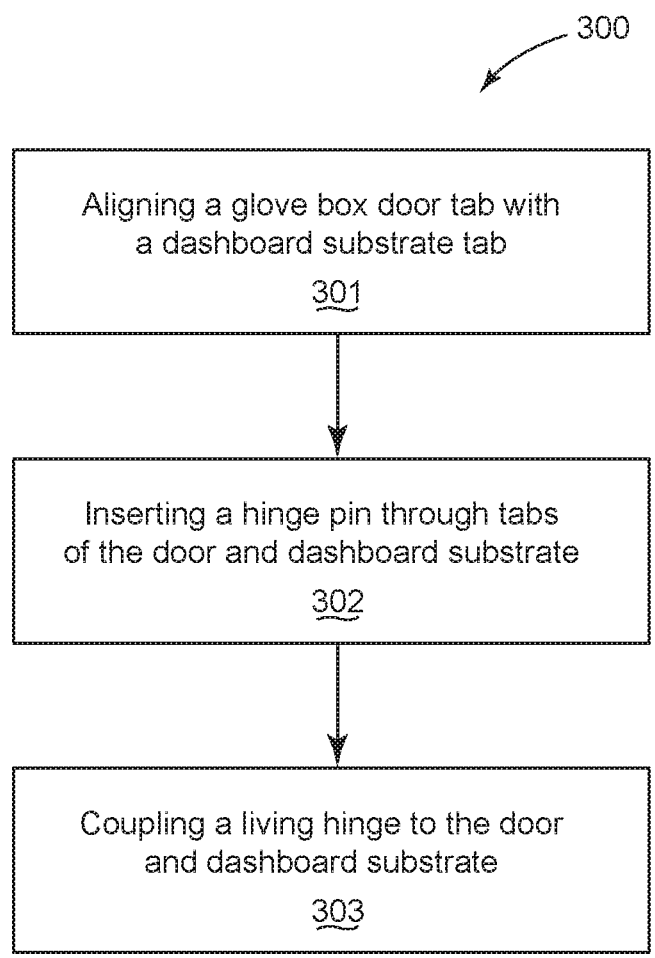
FIG. 5 is a block diagram of a method of installing a glove box assembly of the present invention.

Referring to FIG. 5, a method 300 is shown for the installation of the glove box assembly 1, and includes steps 301, 302, 303. The method 300 includes a first step 301 of aligning the glove box door 10 with the dashboard substrate 20. During step 301, the glove box door 10 is positioned relative to the dashboard substrate 20 (arrow I, FIG. 1A), and the first tab 30 is aligned with the second tab 40, such that the second tab 40 is interposed between the first and second raised portions 31, 32 of the first tab 30. Further, the first and second openings 81, 82 of the second tab 40 are aligned with the first and second apertures 33, 34 of the first tab 30 at step 301. At step 302, the hinge pin 60 is inserted through the first and second tabs 30, 40 in order to pivotably couple the glove box door 10 to the first tab 30. The hinge pin 60 is inserted such that the orthogonal foot 62 is proximate the first raised portion 31 of the first tab 30. Further, the projecting portion 61 is exposed outside of the first and second tabs 30, 40, and is proximate the second raised portion 32 of the first tab 30. The hinge pin 60 is configured to rotate within the channel 80 in order to enable opening and closing of the glove box door 10. At step 303, the living hinge 50 is removably coupled to the dashboard substrate 20, wherein the hinge pin 60 is adapted to retain the longitudinal position of the hinge pin 60. At step 303, the living hinge 50 may be moved between an installed position and an uninstalled position. While the living hinge 50 is in the uninstalled position, the hinge pin 60 may be inserted or removed from the first and second tabs 30, 40. While the hinge pin 60 is removed from the first and second tabs 30, 40, the first and second openings 81, 82 of the second tab 40 may be aligned with the first and second apertures 33, 34 of the first tab 30, respectively, or the glove box door 10 may be removed from the dashboard substrate 20.

Accordingly, the disclosure advantageously provides a glove box assembly for a vehicle and a method of installation for the assembly. The glove box assembly includes a glove box door including a first tab and a living hinge coupled to the glove box door at an articulated connection. A second tab is adapted for coupling the glove box door to a dashboard substrate, and is interposed between first and second raised portions of the first tab. A channel extends through the second tab. A hinge pin extends through the channel to pivotably couple the first and second tabs, and the living hinge retains the longitudinal position of the hinge pin while in an installed position. The living hinge includes a notch configured to clutch an orthogonal foot of the hinge pin in order to retain the longitudinal position of the hinge pin. The living hinge includes at least one resilient retainer portion having at least one snap-fitting element for securing the living hinge to the glove box door in an installed position.

It is also to be understood that variations and modifications can be made on the aforementioned structures and methods without departing from the concepts of the present disclosure. Moreover, the hinge pin and living hinge may be utilized in a variety of vehicle fixtures. For instance, the hinge pin assembly may be used to couple a center console door to a center console compartment. In another embodiment, the hinge pin and living hinge may be configured to couple a storage compartment within a vehicle cabin to a cabin sidewall. Further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A glove box assembly, comprising:
a first tab adapted for coupling to a dashboard substrate;
a glove box door comprising a second tab;
a living hinge;
a hinge pin located within the tabs, and
wherein the tabs are pivotably coupled to the hinge pin and the living hinge retains a longitudinal position of the hinge pin, and
further wherein the first tab comprises a pair of raised portions and the second tab is interposed between the pair of raised portions.

2. The glove box assembly of claim 1, wherein the living hinge is coupled to the dashboard substrate by an articulated connection.

3. The glove box assembly of claim 2, wherein the living hinge comprises a notch configured to secure an orthogonal foot of the hinge pin.

4. The glove box assembly of claim 1, wherein the second tab and the pair of raised portions comprise a channel, the hinge pin extending through the channel.

5. The glove box assembly of claim 1, wherein the living hinge comprises at least one resilient retainer portion coupled to the dashboard substrate.

6. The glove box assembly of claim 5, wherein the at least one resilient retainer portion comprises a snap-fitting element.

7. A glove box assembly, comprising:
a first tab adapted for coupling to a dashboard substrate;
a living hinge removably coupled to the dashboard substrate;
a glove box door comprising a second tab;
a hinge pin located within the tabs; and
wherein the tabs are pivotably coupled to the hinge pin and the living hinge retains a longitudinal position of the hinge pin, and
further wherein the first tab comprises a pair of raised portions and the second tab is interposed between the pair of raised portions.

8. The glove box assembly of claim 7, wherein the living hinge is coupled to the dashboard substrate by an articulated connection.

9. The glove box assembly of claim 8, wherein the living hinge comprises a notch configured to secure an orthogonal foot of the hinge pin.

10. The glove box assembly of claim 7, wherein the tabs comprise a channel, the hinge pin extending through the channel.

11. The glove box assembly of claim 7, wherein the living hinge comprises at least one resilient retainer portion removably coupled to the dashboard substrate.

12. The glove box assembly of claim 11, wherein the at least one resilient retainer portion comprises a snap-fitting element.

13. A method of installing a glove box assembly comprising:
aligning a glove box door tab of a glove box door with a dashboard substrate tab, the dashboard substrate tab adapted for coupling to a dashboard substrate;
inserting a hinge pin through the tabs to pivotably couple the door to the substrate; and
coupling a living hinge to the substrate and the hinge pin, wherein the living hinge retains a longitudinal position of the hinge pin,
wherein the dashboard substrate tab comprises a pair of raised portions and the glove box door tab is interposed between the pair of raised portions.

14. The method of claim 13, wherein the coupling is conducted such that the living hinge is coupled to the dashboard substrate by an articulated connection.

15. The method of claim 14, wherein the living hinge comprises a notch configured to secure an orthogonal foot of the hinge pin.

16. The method of claim 13, wherein the coupling is conducted such that the living hinge is removably coupled to the dashboard substrate by at least one resilient retainer portion of the hinge.

17. The method of claim 16, wherein the at least one resilient retainer portion comprises a snap-fitting element.

* * * * *